United States Patent
Grossetete et al.

(10) Patent No.: US 8,564,689 B2
(45) Date of Patent: Oct. 22, 2013

(54) ACQUISITION SYSTEM FOR IMAGES HAVING A HIGH DYNAMIC RANGE

(75) Inventors: Matthieu Grossetete, Bordeaux (FR); Jean-Claude Ebert, St Medard En Jalles (FR); Jean-Michel Francois, Cadaujac (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/325,678

(22) Filed: Dec. 14, 2011

(65) Prior Publication Data

US 2012/0257070 A1    Oct. 11, 2012

(30) Foreign Application Priority Data

Dec. 14, 2010 (FR) .................................... 10 04870

(51) Int. Cl.
H04N 5/225 (2006.01)
H04N 5/235 (2006.01)
G03B 7/00 (2006.01)

(52) U.S. Cl.
USPC ............. 348/229.1; 348/218.1; 348/362

(58) Field of Classification Search
USPC ..................... 348/218.1, 229.1, 362
See application file for complete search history.

(56) References Cited

U.S. PATENT DOCUMENTS

| | | | |
|---|---|---|---|
| 6,529,640 B1* | 3/2003 | Utagawa et al. | 382/284 |
| 7,428,019 B2* | 9/2008 | Irani et al. | 348/581 |
| 2003/0197791 A1* | 10/2003 | Ogino | 348/218.1 |
| 2007/0159640 A1* | 7/2007 | Berestov | 356/611 |
| 2009/0244717 A1* | 10/2009 | Tocci | 359/636 |
| 2010/0007778 A1 | 1/2010 | Lim | |

FOREIGN PATENT DOCUMENTS

| | | |
|---|---|---|
| EP | 2180692 A1 | 4/2010 |
| JP | 6121224 A | 4/1994 |
| JP | 10108079 A | 4/1998 |
| JP | 2000078460 A | 3/2000 |
| JP | 2000078463 A | 3/2000 |
| JP | 2001136434 A | 5/2001 |

* cited by examiner

Primary Examiner — Tuan Ho
Assistant Examiner — Shahbaz Nazrul
(74) Attorney, Agent, or Firm — Baker Hostetler LLP

(57) ABSTRACT

An image acquisition system comprises: a single set of focussing optics focussing an incident beam from a scene to be imaged on a first sensor and a second sensor exhibiting identical spectral response curves; followed by separation means separating the irradiance of the beam coming from the focussing optics into first and second predetermined fractions, the separation means orienting the first fraction towards the first sensor and the second fraction towards the second sensor; control means for controlling a first acquisition time of the scene to be imaged by the first sensor to obtain a first image and/or a second acquisition time of the scene to be imaged by the second sensor to obtain a second image; and merging means that merge the first image coming from the first sensor and the second image coming from the second sensor to generate a final image.

15 Claims, 1 Drawing Sheet

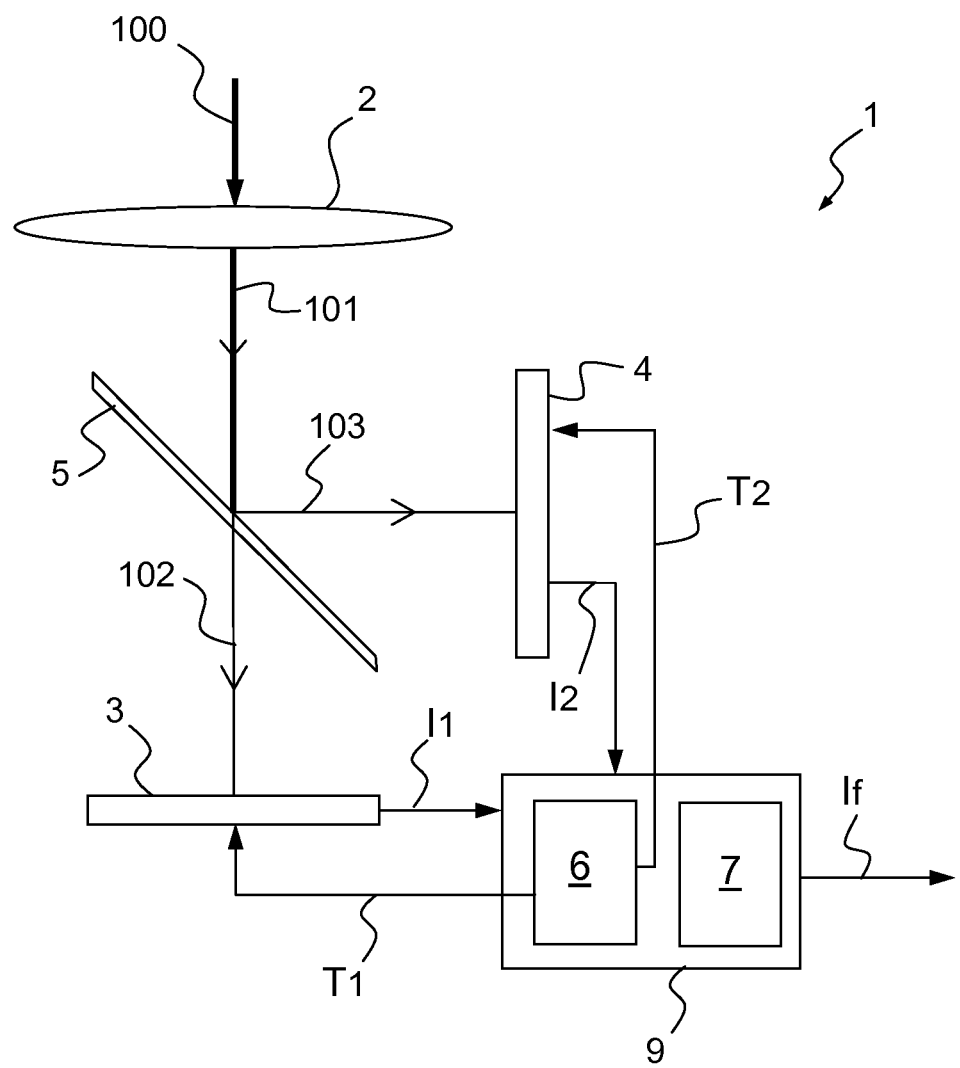

ACQUISITION SYSTEM FOR IMAGES HAVING A HIGH DYNAMIC RANGE

CROSS-REFERENCE TO RELATED APPLICATION

This application claims priority to foreign French patent application No. FR 1004870, filed on Dec. 14, 2010, the disclosure of which is incorporated by reference in its entirety.

FIELD OF THE INVENTION

The invention relates to systems for real-time acquisition of image sequences. It is desirable that image acquisition systems record images having the widest dynamic range possible. In other words, the aim is to produce image acquisition systems that are sensitive in the presence of a low level of illumination and are capable of receiving very bright images without saturation. Typically, it is desirable that image sequence acquisition systems or images having a dynamic range equal to at least 120 dB may be obtained.

BACKGROUND

Several solutions have been investigated for obtaining a wide dynamic range. First of all, there exist solutions using a single sensor equipped with means for image capture with high dynamic range. These systems use various techniques, amongst which is the successive capture of several images with various integration times. If the signal supplied by a pixel of the sensor having undergone a long integration time is saturated, it is replaced using a signal from the same pixel that has undergone a shorter integration time. This pre-supposes that several successive images are taken thus considerably increasing the overall acquisition time and not allowing real time capture of a sequence of images.

Another technique consists in having a mixed matrix with small pixels and large pixels. The small, less sensitive, pixels are used where there is a large amount of light. A complex processing operation is needed, which reduces the overall resolution of the matrix, notably that of the poorly lit regions (only exciting the large pixels).

Another technique consists in measuring the time that a pixel takes to reach saturation in order to deduce from this information on the light level in the presence of saturating illumination. This pre-supposes the use of a "complex" pixel technology that requires "large pixels" consequently resulting in a loss of resolution.

Techniques with pixels using a logarithmic or linear-logarithmic function or a variation in slope of the response curve have furthermore been proposed for pixels with three or more transistors. They are based on a variation of the potential of the gate of the reset transistor for the photodiode. These solutions are sensitive to technological dispersions, namely the dispersion in threshold voltages of the transistors of the various pixels and the dispersion of the dark potential of the photodiode after resetting. They do not allow the dynamic range of the device to be greatly increased (100 dB maximum), increase the spatial noise and involve complex post-processing owing to the modification of the linearity of the grey levels.

The majority of these techniques, except for the hybridization of pixels of different sizes, have the drawback of degrading the signal-to-noise ratio of the dark regions.

Solutions also exist comprising two cameras disposed adjacent to one another, operating with different integration times, and also comprising means for reconstruction of an image common to the two cameras. These solutions have the drawback of requiring a pre-processing phase for the images coming from the two cameras before carrying out the correlation needed for the establishment of an image with high dynamic range. The pre-processing increases the latency time of the device and the correlation degrades the resolution of the overall image owing to the correlation defects of the system and to the possible presence of objects at close distances causing problems of parallax.

SUMMARY OF THE INVENTION

The invention provides an image acquisition system capable of acquiring images with high resolution of a scene exhibiting a very wide dynamic range in illumination, and of doing this with a high image sequence rate.

For this purpose, the subject of the invention is an image acquisition system comprising:
- a single set of focussing optics focussing an incident beam coming from a scene to be imaged on a first sensor and a second sensor exhibiting identical spectral response curves,
- followed by separation means separating the irradiance of the beam coming from the focussing optics into first and second predetermined fractions, the separation means furthermore orienting the first fraction of the beam irradiance coming from the focussing optics towards the first sensor and the second fraction of the irradiance of the beam coming from the focussing optics towards the second sensor,
- control means for controlling a first acquisition time of the scene to be imaged by the first sensor so as to obtain a first image and/or a second acquisition time of the scene to be imaged by the second sensor so as to obtain a second image I2,
- merging means that merge the first image and the second image so as to generate a final image.

This solution allows, by varying at the same time the integration times of the two sensors and for a given distribution of the irradiances that are shone onto the two sensors, the extent of the dynamic range to be varied for a scene to be imaged for which the system is able to supply a high quality image (without saturating at the high luminance end and with a sufficient contrast at the low luminance end). When the scene observed does not exhibit a wide input dynamic range, the resolution of the image obtained may also be increased by varying the distribution of the irradiances and by adjusting the integration times in such a manner as to obtain two images that are identical and can easily be merged with a resolution doubled along each axis. The compromise between resolution and high dynamic range will be able to be modulated according to two preferred embodiments which will be described later.

Advantageously, the control means use an algorithm for controlling the gain.

Advantageously, the control means control the integration time of the first sensor and of the second sensor as a function of the histogram only of the image from the sensor having the shortest integration time between the first sensor and the second sensor.

Advantageously, the control means try to minimize the difference between the first integration time and the second integration time.

Advantageously, the said system is configured in such a manner that the quantity of light received by the first sensor during the acquisition of the first image is greater than the quantity of light received by the second sensor during the acquisition of the second image, the said first sensor being referred to as low-luminance sensor and the second sensor being referred to as high-luminance sensor.

Advantageously, the control means control the second integration time of the image coming from the high-luminance sensor in such a manner that it is not saturated at any point and control the first integration time of the image coming from the low-luminance sensor in such a manner that the regions, of the latter image, with the lowest intensity exhibit a contrast greater than a predetermined threshold.

Advantageously, the weights assigned to the respective pixels of the image coming from the high-luminance sensor, in the final image, are greater the higher their intensity.

Advantageously, the first sensor and the second sensor are superposed.

Advantageously, the first sensor and the second sensor are offset with respect to one another substantially by half a pixel along the rows and the columns of the matrices of pixels formed by the first sensor and the second sensor.

Advantageously, the merging of the first image and the second image is obtained by linear combination of the intensities of the pixels of these two images.

Advantageously, the merging means start the calculation of the weights assigned to the respective pixels of the first image and of the second image, based on the image whose integration time is the shortest, before the end of the acquisition of the image whose integration time is the longest.

In a first embodiment, the first fraction is in the range between a lower fraction, greater than 0%, and 10% of the irradiance of the light beam coming from the focussing optics.

Advantageously, the first fraction is equal to 5% of the irradiance of the light beam coming from the focussing optics.

As a variant, the first fraction is equal to 50% or in the range between 20% and 50% of the irradiance of the light beam coming from the focussing optics.

BRIEF DESCRIPTION OF THE DRAWINGS

Other features and advantages of the invention will become apparent upon reading the detailed description that follows, presented by way of non-limiting example and with reference to the appended drawings in which:

FIG. 1 shows schematically an image acquisition system according to the invention.

DETAILED DESCRIPTION

In FIG. 1, the image acquisition system 1 according to the invention is shown.

This system 1 comprises a single set of focussing optics 2 focussing an incident beam 100 coming from a scene to be imaged onto a first sensor 3 and a second sensor 4 which have substantially identical spectral response curves.

Advantageously, the sensors have the same resolution and pixels of the same size.

Preferably, the sensors are identical.

The sensors are, for example, CCD or CMOS sensors, but any other type of photographic sensors may be used.

The two sensors 3, 4 are advantageously synchronized. In other words, control means 6, which will be described later, are capable of triggering and halting the acquisitions, also referred to as integrations, of images by the two sensors, simultaneously or at different times.

The acquisition system 1 furthermore comprises separation means 5 separating the irradiance of the beam coming from the focussing optics 101 into predetermined first 102 and second 103 fractions. The sum of the first fraction 102 and the second fraction 103 of the beam is equal to 100% of the irradiance of the beam coming from the focussing optics 101.

The separation means 5 furthermore orient the first fraction 102 of the light beam 101 onto the first sensor 3, and the second fraction 103 of the light beam 101 onto the second sensor 4. In the figure, the separation means take the form of a separating plate. The separating plate has advantageously been subjected to a dichroic processing operation or thin-film processing designed to perform the separation of the incident irradiance into the desired proportions. The separating plate is configured so as to transmit the first portion 102 and to reflect the second portion 103, but this could equally be the reverse.

A separating cube can also be used.

The system also comprises processing means 9 including:
control means 6 for controlling the first acquisition time T1, in other words the first integration or acquisition time of the scene to be imaged by the first sensor 3, so as to obtain a first image I1, and/or for controlling the second acquisition time T2, in other words the second integration or acquisition time of the scene to be imaged by the second sensor 4, so as to obtain a second image I2, and, merging means 7 merging a first image I1 coming from the first sensor 3 and a second image I2 coming from the second sensor 4 so as to generate a final image If.

The control means for example take the form of one or more electronic units. This is, for example, an onboard electronic unit, in other words an electronic unit integrated into a camera incorporating the two sensors 3, 4.

The merging means for example take the form of electronic units, for example of the FPGA (field-programmable gate array) type.

By choosing suitable integration times and a suitable distribution of the irradiances, an image can be obtained with a higher resolution and a high quality over a wider dynamic range than if the image had been obtained by means of a single sensor.

Indeed, the irradiance coming from the single set of focussing optics is separated into two irradiances of predetermined proportions. The first sensor receives a first fraction % lum1 of the irradiance of the beam coming from the focussing optics and the second sensor receives a second fraction % lum2 of the irradiance of the beam coming from the focussing optics.

The first sensor 4 is adjusted over the first integration time T1 and configured for collecting, without saturation, luminances situated within a first range of operation running from a first minimum luminance L1min up to a first maximum luminance L1max. By the choice of a sensor model with a conventional dynamic range, the first minimum L1min and maximum L1max luminances will, for example, be obtained for the same scene such that the dynamic range of the sensor Dync is equal to around 80 dB, given by $$Dync = 20\ \log\left(\frac{L1\max}{L1\min}\right) \approx 80\ \text{dB}.$$

Similarly, the second sensor, which has the same dynamic range as the first sensor, is adjusted over the second integration time T2 and configured for collecting, without saturation and for the same scene, luminances situated within a second range of operation running from a second minimum luminance L2min up to a second maximum luminance L2max. L2max is given by $$L2\max = L1\max * \frac{T1 * \%lum1}{T2 * \%lum2}$$

(due to the fact that the sensors exhibit the same spectral response curves).

The dynamic range, for the same scene, of the system Dyns comprising the two sensors is equal to:

$$Dyns = 20 \log\left(\frac{L2\max}{L1\min}\right) = 20 \log\left(\frac{L1\max}{L1\min} * \frac{T1 * \%lum2}{T2 * \%lum2}\right)$$

$$Dyns = 20 \log\left(\frac{L1\max}{L1\min}\right) + 20 \log\left(\frac{T1 * \%lum1}{T2 * \%lum2}\right)$$

This gives a gain in dynamic range of:

$$Dyns = Dync + 20 \log\left(\frac{T1 * \%lum1}{T2 * \%lum2}\right)$$

If a configuration of the system is considered such that the quantity of light received by the first sensor during the integration of the first image is greater than the quantity of light received by the second sensor during the integration of a image, in other words T1*% lum1>T2*% lum2, the system according to the invention has a dynamic range Dyns greater than the dynamic range of the sensors employed Dync.

In the following part of the text, the first sensor 3, receiving the greater quantity of light during the integration of an image, is referred to as low-luminance sensor because it has the function of providing information to the final image within the range of low luminances.

In the following part of the text, the second sensor 4, receiving the smaller quantity of light during the integration of an image, is referred to as high-luminance sensor because it has the function of providing information to the final image within the range of high luminances.

According to a first feature, the two integration times T1 and T2 are variable.

Advantageously, the integration time of one of the sensors is fixed—or adaptive servo-controlled—and configured in such a manner as to obtain a corrected image of the majority of the scenes with which the system will be confronted—in this case, only the integration time of the other sensor is servo-controlled by the control means 6 in such a manner as to recover the information from the saturated regions of the sensor whose integration time is fixed or adaptive servo-controlled. This feature allows the control logic for the integration times to be simplified.

Advantageously, the control means 6 employ an algorithm for controlling the gain for adjusting the integration times T1, T2.

Advantageously, the control means control the integration time of the sensors as a function of the histogram only of the image acquired by the sensor having the shortest integration time. Histogram is understood to mean the function that associates with an intensity value the number of pixels having this intensity value. The control of the integration times is therefore applied as a function of a single histogram which is the histogram of the image acquired by the sensor having the shortest integration time.

This allows an image acquisition system to be obtained having a high sequence rate. It is not necessary to wait for the end of the acquisition of the image by the sensor with the longest acquisition time in order to calculate the new integration times. The latency time of the system is thus reduced.

The integration times of the images are updated after the acquisition of these images. In other words, the integration times are updated for the next acquisition of the images I1 and I2.

In one advantageous variant, the integration time of the image having the longest integration time is updated based on the histogram of the image having the shortest integration time before the end of the acquisition of the image having the longest integration time. Thus, the longest integration time can vary during the acquisition of the corresponding image.

This feature enables an improved reactivity of the system to the changes in luminance. It also allows the latency time of the system to be decreased.

Advantageously, the means for controlling the integration times try to minimize the difference between the respective integration times of the two sensors. This feature allows the resolution of the final image obtained to be maximized.

Examples of adjustment of the integration times are given hereinbelow.

In the configuration in which T1*% lum1>T2*% lum2, the first sensor can be adjusted such that it detects, without saturation, the scenes to be imaged having a predetermined dynamic range. If it is desired that the second sensor be used to generate a high dynamic range, the control means 6 do not vary the second integration time T2 as long as the second image I2 coming from the second sensor 4 does not exhibit any saturation. As soon as the second image I2 exhibits a saturation, the control means 6 reduce the second integration time T2. This allows a system to be obtained with a high dynamic range and a high resolution because the two sets of information coming from the images I1, I2 from the two sensors 3, 4 overlap.

In the configuration in which T1* % lum1>T2* % lum2, the control means 6 can control the integration time of the high luminance image I2 in such a manner that it is not saturated at any point and can control the first integration time T1 of the low luminance image I1 in such a manner that the regions of the low luminance image I1 having the lowest intensity exhibit a greater contrast than a predetermined threshold. A final high quality image of a scene with a very wide dynamic range can thus be obtained by favouring the areas of high intensity of the image with high dynamic range I2 and the areas of low intensity of the image with low dynamic range I1. By minimizing the difference between the two integration times T1, T2, a final image with high resolution is also obtained.

Thus, by using sensors with a dynamic range of 80 dB, a plate separating the irradiance into a first fraction 102 equal to 95% of the irradiance coming from the focussing optics, and a second fraction 103 equal to 5% of the irradiance of the beam 101, and by choosing a first integration time T1 equal to 10 ms and a second integration time T2 equal to 10 µs, a resultant image If with a dynamic range greater than 160 dB is obtained.

This system therefore allows not only an image with very high dynamic range exhibiting a linear response to the illumination to be obtained but also the intrinsic performance specifications of the sensors used to be preserved. Indeed, CCD or CMOS sensors exhibit a response linearly intrinsic to the technology used that is conserved by an adaptive re-adjustment of their dynamic range during the merging step.

Furthermore, owing to the fact that a single set of optics 2 illuminates the two sensors, the system according to the invention does not present problems of parallax. This feature obviates the need for calculations to overcome problems of parallaxes and of distortion in the final image. The problems of increase in the latency time of the system are thus avoided which allows images to be supplied at a high sequence rate. The problem of the decrease in the resolution linked to these calculations is also overcome. Furthermore, this feature allows the two images to be repositioned even where the scene to be observed presents a significant depth of field.

The sensors can be superposed. In this configuration, the same point of the scene to be imaged appears on the same pixel of each of the two sensors thus enabling a fast merging step.

In one advantageous variant, the first sensor 3 and the second sensor are disposed in such a manner as to be offset with respect to one another substantially by half a pixel along the rows and the columns of the matrices of pixels formed by the first sensor and the second sensor. In other words, the two sensors see the same scene but the latter is seen by the two respective sensors in a manner shifted by half a pixel along the rows and the columns of the matrices of pixels formed by the two sensors 3, 4.

This allows the merging means 7 to compose a final image having a resolution up to 4 times higher than that of the original sensors 3, 4.

The merging means 7 merge the first image I1 and the second image I2 so as to obtain a final image If. A data processing module (in wired logic or adapted signal processor) is for example used.

The merging means 7 comprise means for harmonizing the respective dynamic range scales of the first image I1 and of the second image I2 prior to the merging of the said images. This allows the system to conserve an interpretable image since it exhibits a linear coding scale for grey levels with respect to the luminance of the scene.

It is a question, for example, in the configuration where $T1*\%$ lum1>$T2*\%$ lum2, of multiplying the intensity of the pixels of the high luminance image (Pixels of the second sensor 4) by the ratio $T1*\%$ lum1 divided by $T2*\%$ lum2. Indeed, the ratio of proportion of light distributed over the 2 sensors must also be used.

The merging of the first image I1 and the second image I2 is obtained by assigning respective weights to the pixels of each of the images in order to form the final image If. This step is, for example, carried out by bilinear interpolation of the intensities of the pixels corresponding to each of the images with a weight specifically assigned to each pixel of each of the two images.

Advantageously, the weights assigned to the pixels of the high luminance image I2, in the final image If, are greater the higher their intensities, (the respective pixels of the first image I1 running the risk of being highly saturated and hence of not carrying any information). The weights of the pixels of the low luminance image I1, in the final image, are therefore greater the lower their intensities (because the values of the intensities of the respective pixels of the second image I2 will be much lower and hence more sensitive to the various reading and digitization noises).

This allows a final high quality image If to be obtained of a scene having a very high dynamic range. One of the sensors is used to supply information for the regions of high luminance and the other sensor to supply information for the regions of low luminance.

As a variant, the merging of the first and the second image is obtained by simple linear combination of the intensities of the pixels of the two images. This variant allows the latency time of the system to be reduced.

Advantageously, the merging means start the merging process, for example, by calculating the weights assigned to the pixels of the first image I1 and of the second image I2, based on the image whose integration time is the shortest, before the end of the acquisition of the image whose integration time is the longest. This allows the latency time of the system to be decreased and images with a high sequence rate to be obtained.

The merging means 6 predict, for example, based on the image whose integration time is the shortest, the position of the saturated regions on the image with the longest integration time during the acquisition of this image.

In a first embodiment, the separation means 5 are configured in such a manner that the difference between the first fraction 102 and the second fraction 103 is the maximum difference that does not result in any distortion being generated in the final image.

Typically, the second fraction 103 is in the range between a lower fraction (greater than 0%) and 10% of the irradiance of the beam 101. Consequently, the first fraction 102 is in the range between 90% of the irradiance coming from the focussing optics and an upper fraction corresponding to the difference between 100% and the lower fraction.

The lower fraction and the upper fraction are the respective high and low limits beyond which the final image exhibits distortions.

The applicant has observed that the maximum dynamic range is obtained with a first fraction 102 of 95% and a second fraction 103 of 5% of the irradiance of the beam 101.

In this configuration, the sensor illuminated by the weakest irradiance has the capacity to acquire high luminances without being saturated, whereas the sensor receiving the remainder of the irradiance has the capacity to differentiate the levels of lowest light intensities from the rest of the field.

In a second embodiment, the first fraction of the irradiance is approximately equal to 50%. The term "approximately equal to 50%" is understood to mean that the second fraction is either equal to 50% or in the range between 20% and 50% of the irradiance coming from the focussing optics. This second case (first fraction in the range between 50 and 80%) is valid when the first sensor is the low-luminance sensor.

This embodiment is advantageous when it is desired to mainly gain in resolution of the system while at the same time conserving the possibility of increasing the dynamic range acceptable by the system in the case of presence of dazzling light in the field. As a result, a system having a better resolution than one using a single sensor is obtained. For example, in the case where the two sensors 3, 4 are offset with respect to one another by half a pixel along the rows and along the columns of pixels, an image having a resolution four times higher than the image coming from one sensor is obtained. Furthermore, the merging between the first image I1 and the second image I2 (simple bilinear interpolation according to the calibration model) is not very costly in terms of processing operations which limits the availability latency of the image.

In addition, according to the equations previously presented, it can be observed that it is possible to gain in dynamic range with respect to the single sensor by controlling the integration times T1, T2 of the two sensors 3, 4. Up to around 60 dB of dynamic range may be gained by only varying the respective integration times T1, T2 of the sensors 3, 4.

The invention claimed is:

1. An image acquisition system, comprising:
a single set of focussing optics focussing an incident beam coming from a scene to be imaged on a first sensor and a second sensor exhibiting identical spectral response curves, followed by separation means separating the irradiance of the beam coming from the focussing optics into a first and a second predetermined fraction, the separation means furthermore orienting the first fraction of the beam irradiance coming from the focussing optics towards the first sensor and the second fraction of the light beam coming from the focussing optics towards the second sensor, control means for controlling a first acquisition or integration time of the scene to be imaged by the first sensor so as to obtain a first image and/or a second acquisition or integration time of the scene to be imaged by the second sensor so as to obtain a second image, and merging means that merge the first image coming from the first sensor and the second image coming from the second sensor so as to generate a final image, the control means controlling the integration time of the first sensor and of the second sensor as a function of the histogram only of the image from the sensor having the shortest integration time between the first sensor and the second sensor.

2. The acquisition system according to claim 1, wherein the control means employ an algorithm for controlling the gain.

3. The acquisition system according to claim 1, wherein the control means try to minimize the difference between the first integration time and the second integration time.

4. The acquisition system according to claim 1, said system being configured in such a manner that the quantity of light received by the first sensor during the acquisition of the first image is greater than the quantity of light received by the second sensor during the acquisition of the second image, the said first sensor being a low-luminance sensor and the second sensor being a high-luminance sensor.

5. The acquisition system according to claim 4, wherein the control means control the second integration time of the second image coming from the high-luminance sensor in such a manner that it is not saturated at any point and control the first integration time of the first image coming from the low-luminance sensor in such a manner that the regions, of the latter image, with the lowest intensity exhibit a contrast greater than a predetermined threshold.

6. The acquisition system according to claim 4, wherein the weights assigned to the respective pixels of the image coming from the high-luminance sensor, in the final image If, are greater the higher their intensity.

7. The acquisition system according to claim 1, wherein the first sensor and the second sensor are superposed.

8. The acquisition system according to claim 1, wherein the first sensor and the second sensor are offset with respect to one another substantially by half a pixel along the rows and the columns of the matrices of pixels formed by the first sensor and the second sensor.

9. The acquisition system according to claim 1, wherein the merging of the first image and of the second image is obtained by linear combination of the intensities of the pixels of these two images.

10. The acquisition system according to claim 1, wherein the merging means start the calculation of the weights assigned to the respective pixels of the first image and of the second image, based on the image whose integration time is the shortest, before the end of the acquisition of the image whose integration time is the longest.

11. The acquisition system according to claim 1, wherein the second fraction is in the range between a lower fraction, greater than 0%, and 10% of the irradiance of the light beam coming from the focussing optics.

12. The acquisition system according to claim 11, wherein the first fraction is equal to 95% of the irradiance of the light beam coming from the focussing optics.

13. The acquisition system according to claim 1, wherein the first fraction is equal to 50% or in the range between 50% and 80% of the irradiance of the light beam coming from the focussing optics.

14. The acquisition system according to claim 1, wherein the respective integration times of the respective images are updated after the acquisition of the said images.

15. The acquisition system according to claim 1, wherein the integration time of the image having the longest integration time is updated based on the histogram of the image having the shortest integration time before the end of the acquisition of the image with the longest integration time.

* * * * *